May 31, 1966   D. BROMLEY   3,253,738
NUCLEAR REACTOR VALVE
Filed Aug. 5, 1963
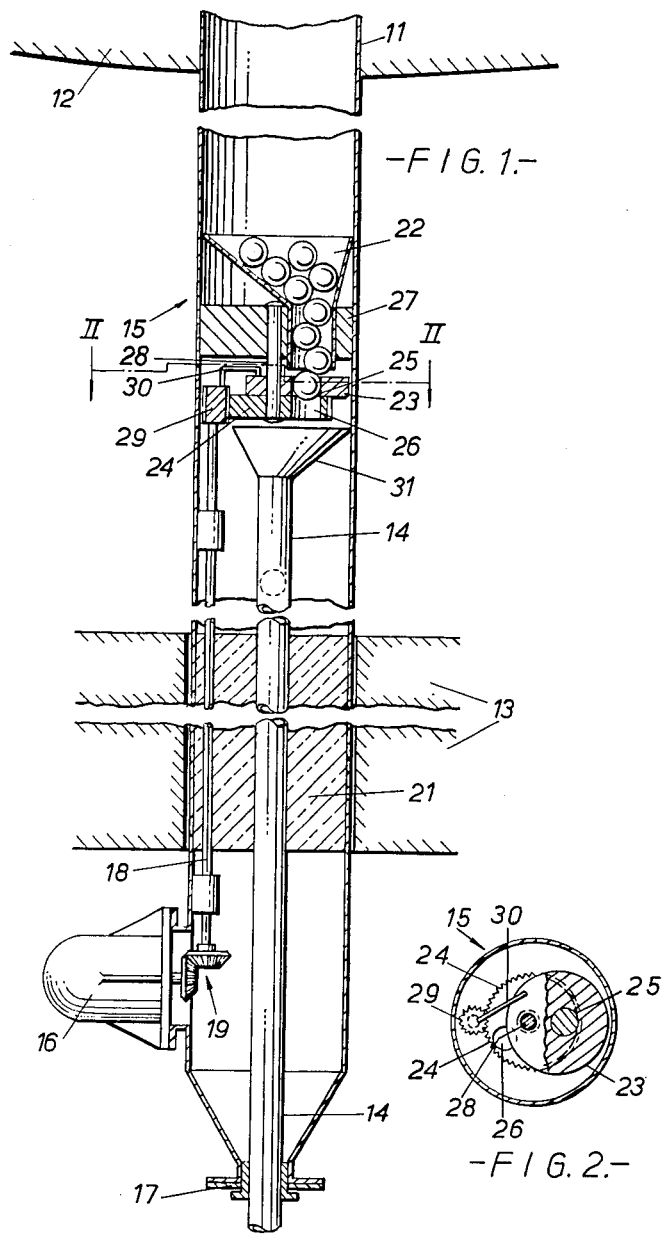
INVENTOR:
DEREK BROMLEY
BY
Larson and Taylor
Attorneys 3,253,738
NUCLEAR REACTOR VALVE
Derek Bromley, Cheadle, near Stockport, England, assignor to United Kingdom Atomic Energy Authority, London, England
Filed Aug. 5, 1963, Ser. No. 299,703
Claims priority, application Great Britain, Aug. 28, 1962, 32,937/62
3 Claims. (Cl. 221—200)

This invention relates to a device for a nuclear reactor and more particularly to a device through which discrete pebbles of nuclear material, for example pebble fuel elements, may be passed for the purpose of charging or discharging a nuclear reactor.

In copending U.S.A. patent application Serial No. 283,456, filed May 27, 1963, and owned by the assignee of this application there is described a nuclear reactor in which the fuel elements are in the form of pebbles. Those pebbles may, but need not, be spherical. There are other known reactors in which pebbles containing fertile material constitute a blanket of breeder material and pebbles containing moderating material constitute the moderator or reflector for a reactor. In these reactors it is necessary to devise means for charging and discharging the pebbles into and out of the reactor.

It has been found that spheres will flow freely, without bridging, through channels of diameter at least five times greater than the diameter of the spheres and, in single file, through channels of diameter greater than one but less than 1.7 times the diameter of the spheres. Accordingly, it is proposed to pass pebbles out of the reactor through discharge channels of diameter at least five times greater than the average pebble diameter and to provide a valve whereby pebbles may be removed in single file from this discharge channel. It is to be understood that, if desired, pebbles may be introduced singly into a reactor in like manner.

The present invention provides a device for passing pebbles of nuclear material comprising an inlet channel, a funnel to receive pebbles from the inlet channel, an outlet channel to receive pebbles from the funnel, and interposed between the funnel and the outlet channel an oscillator and a controller, the oscillator having an aperture to permit passage of single pebbles and being capable of oscillation to impart vibrations to pebbles in the funnel and the controller having an aperture to permit passage of single pebbles and being capable of cyclic movement to pass a single pebble periodically into the outlet channel.

One embodiment of the invention will now be described by way of example with reference to the accompanying drawings in which FIGURE 1 is a diagrammatic view of the embodiment, and FIGURE 2 is a sectional view on line II—II of FIGURE 1 but with the controller rotated from its position in FIGURE 1 and with only a single pebble shown in section.

From a reactor employing fuel elements in the form of pebbles, for instance as described in copending U.S.A. patent application Serial No. 283,456, a discharge conduit 11 passes outwardly through a reactor vessel 12 and a biological shield 13. The discharge conduit has a diameter greater than five times the diameter of the fuel pebbles which are to pass through it so that the pebbles flow freely without bridging. These pebbles are discharged to an outlet channel 14 which has a diameter greater than one but less than 1.7 times the diameter of a pebble so that single pebbles can flow freely down the outlet channel. The discharge of pebbles from the discharge conduit to the outlet channel is effected by means of a device 15 situated between the reactor vessel and the biological shield, the device being driven by a motor 16 located outside the biological shield. The device is housed within the discharge conduit which extends below the motor and is closed by a joint 17 through which the outlet channel passes in a pressure-tight manner. The outlet channel extends upwardly within the discharge conduit to the device. A driving rod 18 also extends upwardly within the discharge conduit to the device; this rod is rotated by the motor through bevel gears 19. A plug 21 of shielding material is housed by the discharge conduit at the level of the biological shield, the plug having apertures to pass the outlet channel and the driving rod; the plug reduces the loss of shielding caused by the passage of the discharge conduit through the biological shield.

The device comprises an inlet channel constituted by the discharge conduit above the device, a funnel 22 to receive fuel pebbles from the inlet channel and to discharge pebbles to the outlet channel, and interposed between the funnel and the outlet channel an oscillator 23 and a controller 24, the oscillator having an aperture 25 to permit passage of single pebbles and being oscillated angularly to impart vibrations to pebbles in the funnel and the controller having an aperture 26 to permit passage of single pebbles and being cycled to pass a single pebble periodically into the outlet channel. The funnel 22 is carried by a fixed plate 27 which extends transversely over the conduit 11. The mouth of the funnel extends across the conduit while the neck is directed through the plate and is off-centre with respect to the axis of the conduit. The oscillator and the controller are both circular plates carried by a pin 28 which depends from the plate 27. The controller is mounted for rotation about the pin and is cycled by being rotated by the driving rod through a pinion 29 which engages external teeth on the controller. On the other hand the oscillator, also mounted on the pin 28, is caused to oscillate by an eccentric link 30 mounted on the pinion 29. A funnel 31 at the upper end of the outlet channel has a mouth placed below the neck of the funnel 22 to catch any pebble passing through the oscillator and the controller.

In operation the vibrations of the oscillator agitate pebbles in the funnel 22 sufficiently to ensure their free flow. A single pebble is retained in the aperture of the oscillator until rotation of the controller brings the aperture in the controller below the aperture in the oscillator. While it is retained in the oscillator the pebble is moved backwards and forwards across the neck of the funnel 22 agitating the pebbles in the neck so that vibrations are imparted to the pebbles in the funnel. When the aperture in the controller is brought below the aperture in the oscillator the pebble falls into the funnel 31 and is discharged to the outlet channel. In this way the device according to this invention effects a metered discharge of spaced fuel pebbles from the discharge conduit into the outlet channel. The rate at which pebbles are discharged through the device is fixed by the rate of rotation of the controller. The frequency of the oscillations of the oscillator is chosen with respect to the rate of rotation of the controller so that pebbles retained in the oscillator are oscillated sufficiently to agitate the pebbles in the funnel 22 and therefore to prevent bridging of pebbles in the funnel.

It is to be understood that the present invention is not limited to the details of the foregoing example. For instance the device may be employed to charge fuel pebbles into a reactor or may be required to handle other units of nuclear material such as pebbles of moderator material. Furthermore, it is envisaged that the upper surface of the oscillator could be roughened or made undulating so that any pebble resting on this surface which has not yet entered the aperture 25 is vibrated in a vertical sense.

What I claim is:

1. A device for passing pebbles of nuclear material comprising a tubular casing one end of which constitutes an inlet channel, a funnel within the casing to receive pebbles from the inlet channel, a fixed plate mounted within the casing to carry the funnel, an axle supported by the fixed plate, a circular agitator plate mounted for oscillatory movement at the funnel outlet about the axle, an aperture in the agitator plate to permit passage of a single pebble therethrough, a circular controller plate also mounted for rotary movement about the axle relative to the agitator plate and located on the side of the agitator plate away from the funnel, an aperture in the controller plate to permit passage of a single pebble therethrough, this aperture and the aperture in the agitator plate being spaced radially of the axle by equal distances, a drive spindle extending within the casing, a drive link between the spindle and the agitator plate to cause oscillation of the agitator plate about the axle to impart vibrations to pebbles in the funnel by way of pebbles between the agitator plate and the funnel, a drive link between the spindle and the controller plate to rotate the controller plate about the axle, and an outlet channel coaxial within the casing to receive pebbles passed through the controller when the apertures in the oscillator and controller plates are aligned.

2. A device as claimed in claim 1 wherein the ratio of the diameters of the inlet channel and the pebbles to be passed is greater than 5 and the ratio of the diameters of the outlet channel and the pebbles lies between 1 and 1.7.

3. A device for passing pebbles of nuclear material comprising an inlet channel, a funnel to receive pebbles from the inlet channel, an agitator plate mounted for oscillatory movement at the funnel outlet about an axis aligned with the inlet channel, an aperture in the agitator plate to permit passage of a single pebble therethrough, a controller plate mounted for rotary movement about said axis relative to the agitator plate and located on the side of the agitator away from the funnel outlet, an aperture in the controller plate to permit passage of a single pebble therethrough, a drive mechanism to oscillate the agitator plate about its rotary axis to impart vibrations to pebbles in the funnel by way of pebbles between the funnel and the agitator plate and to rotate the controller plate about its rotary axis to cause periodic passage of a single pebble through the device when the apertures in the agitator plate and the controller plate are aligned, and an outlet channel to receive pebbles passed through the device.

References Cited by the Examiner

UNITED STATES PATENTS

| 1,566,626 | 12/1925 | Steele | 221—200 |
| 2,553,095 | 5/1951 | Jones | 221—265 |
| 2,330,256 | 9/1943 | Ashton | 221—265 |

LOUIS J. DEMBO, *Primary Examiner.*

WALTER SOBIN, *Examiner.*